United States Patent [19]

Tank et al.

[11] Patent Number: 5,505,748
[45] Date of Patent: Apr. 9, 1996

US005505748A

[54] METHOD OF MAKING AN ABRASIVE COMPACT

[76] Inventors: Klaus Tank, 9 Warbleton Avenue, Essexwold, Johannesburg; Alan R. Jarvis, 320 Suncrest, Isipingo Road, Bellevue East; Aulette Stewart, 45 Arend Avenue, Randburg, all of South Africa

[21] Appl. No.: 249,942

[22] Filed: May 27, 1994

[30] Foreign Application Priority Data

May 27, 1993 [ZA] South Africa ............................ 93/3716

[51] Int. Cl.⁶ ..................................................... B24D 18/00
[52] U.S. Cl. .................. 51/293; 51/295; 51/307; 51/309
[58] Field of Search ............................ 51/293, 307, 295, 51/309

[56] References Cited

U.S. PATENT DOCUMENTS

| | | | |
|---|---|---|---|
| 3,136,615 | 6/1964 | Bovenkerk et al. | 51/307 |
| 3,233,988 | 2/1966 | Wentorf, Jr. et al. | 51/307 |
| 3,743,489 | 7/1973 | Wentorf, Jr. | 51/307 |
| 3,745,623 | 7/1973 | Wentorf, Jr. et al. | 407/119 |
| 3,767,371 | 10/1973 | Wentorf, Jr. et al. | 51/307 |
| 4,247,304 | 1/1981 | Morelock | 51/295 |
| 4,311,490 | 1/1982 | Bovenkerk et al. | 51/307 |
| 4,505,746 | 3/1985 | Nakai et al. | 75/243 |
| 4,604,106 | 8/1986 | Hall et al. | 51/293 |
| 4,647,546 | 3/1987 | Hall, Jr. et al. | 51/307 |
| 4,861,350 | 8/1989 | Phaal et al. | 51/307 |
| 5,010,043 | 4/1991 | Ringwood | 51/307 |
| 5,011,514 | 4/1991 | Cho et al. | 51/295 |
| 5,200,372 | 4/1993 | Kuroyama et al. | 501/96 |

OTHER PUBLICATIONS

Patent Abstracts of Japan, vol. 9, No. 174 (M–399) Jul. 1985 and JP–A–60 048 260 (Fuji Die K.K.) 15 Mar. 1985.

*Primary Examiner*—Deborah Jones
*Attorney, Agent, or Firm*—Scully, Scott, Murphy & Presser

[57] ABSTRACT

A method of producing an abrasive compact, particularly a diamond abrasive compact, is provided. The method uses conventional compact manufacture conditions and is characterized by the mass of abrasive particles which is used. This mass has an average particle size of less than 20 and consists of particles having at least three different average particle sizes.

12 Claims, 1 Drawing Sheet

METHOD OF MAKING AN ABRASIVE COMPACT

BACKGROUND OF THE INVENTION

This invention relates to a method of making an abrasive compact.

Abrasive compacts are used extensively in cutting, milling, grinding, drilling and other abrasive operations. Abrasive compacts consist of a mass of diamond or cubic boron nitride particles bonded into a coherent, polycrystalline conglomerate. The abrasive particle content of abrasive compacts is high and there is generally an extensive amount of direct particle-to-particle bonding. Abrasive compacts are generally made under elevated temperature and pressure conditions at which the abrasive particle, be it diamond or cubic boron nitride, is crystallographically stable.

Abrasive compacts tend to be brittle and in use they are frequently supported by being bonded to a cemented carbide substrate or support. Such supported abrasive compacts are known in the art as composite abrasive compacts. Composite abrasive compacts may be used as such in a working surface of an abrasive tool.

Examples of composite abrasive compacts can be found described in U.S. Pat. Nos. 3,745,623, 3,767,371 and 3,743,489.

Composite abrasive compacts are generally produced by placing the components, in particulate form, necessary to form an abrasive compact on a cemented carbide substrate. This unbonded assembly is placed in a reaction capsule which is then placed in the reaction zone of a conventional high pressure/high temperature apparatus. The contents of the reaction capsule are subjected to suitable conditions of elevated temperature and pressure.

U.S. Pat. No. 4,861,350 describes a tool component comprising an abrasive compact bonded to a cemented carbide support in which the abrasive compact has two zones which are joined by an interlocking, common boundary. The one zone provides the cutting edge or point for the tool component, while the other zone is bonded to the cemented carbide support. In one embodiment of the tool component, the zone which provides the cutting edge or point has ultra-hard abrasive particles which are finer than the ultra-hard abrasive particles in the other zone. There is no disclosure of using a mixture of ultra-hard abrasive particles of different particle size.

U.S. Pat. No. 4,311,490 describes an abrasive compact wherein the bonded abrasive particles comprise a coarse layer and a fine layer. Again, the use of a mixture of abrasive particles of different particle size is not disclosed.

U.S. Pat. No. 4,604,106 describes a composite diamond abrasive compact comprising at least one layer of diamond crystals and pre-cemented carbide pieces which have been pressed under severe heat and pressure to create a composite polycrystalline material wherein polycrystalline diamond and pre-cemented carbide pieces are interspersed in one another. In one embodiment, a mixture of diamond particles is used, 65 percent of the particles being of the size 4 to 8 microns and 35 percent being of the size 0.5 to 1 micron.

U.S. Patent No. 5,011,514 describes a thermally stable diamond compact comprising a plurality of individually metal-coated diamond particles wherein the metal coatings between adjacent particles are bonded to each other forming a cemented matrix. Examples of the metal coating are carbide formers such as tungsten, tantalum and molybdenum. The individually metal-coated diamond particles are bonded under diamond synthesis temperature and pressure conditions. The patent further discloses mixing the metal-coated diamond particles with uncoated smaller sized diamond particles which lie in the interstices between the coated particles. The smaller particles are said to decrease the porosity and increase the diamond content of the compact. Examples of bimodal compacts, i.e. two different particle sizes, and trimodal compacts, three different particles sizes, are described.

SUMMARY OF THE INVENTION

According to the present invention, a method of making an abrasive compact which includes the step of subjecting a mass of ultra-hard abrasive particles to conditions of elevated temperature and pressure suitable for producing an abrasive compact, is characterized by the mass of ultra-hard abrasive particles having an average particle size of less than 20, preferably less than 15, microns and consisting of particles having at least three different average particle sizes i.e. at least a tri-modal particle size distribution.

The invention further provides an abrasive compact produced by this method and the use of such a compact as a tool insert in the turning or cutting of a substrate or drilling.

DESCRIPTION OF EMBODIMENTS

Figure 1:
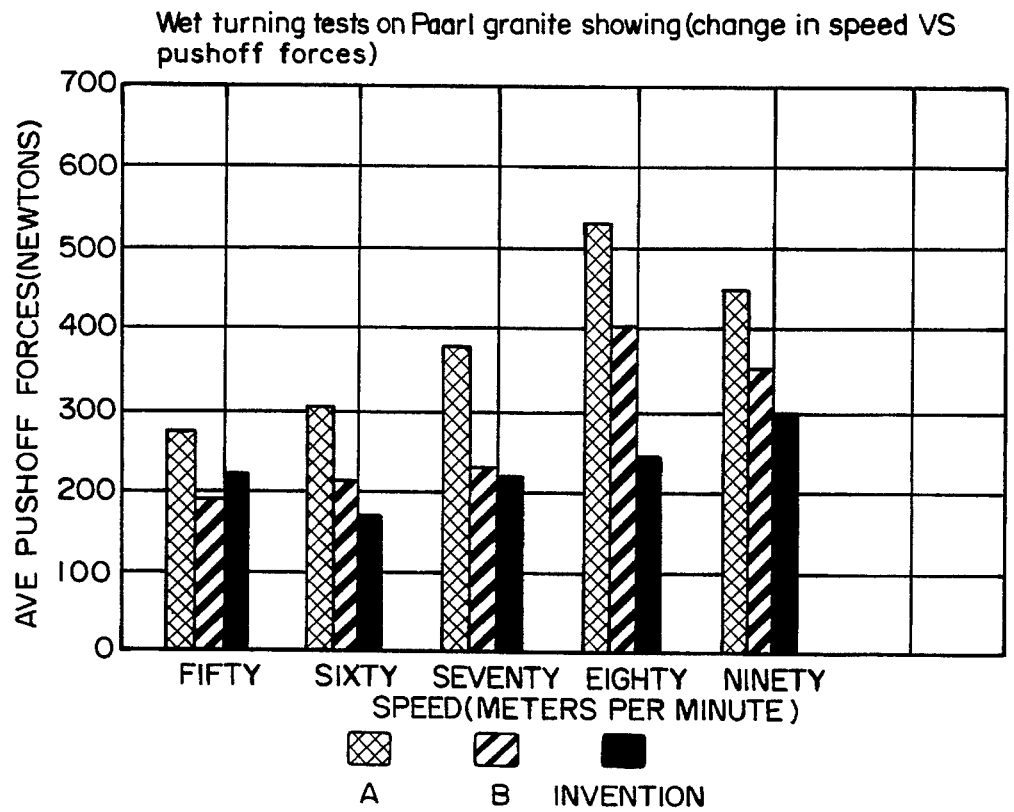
FIGS. 1 and 2 illustrate graphically comparative tests carried out using a compact of the invention and prior art compacts.

The ultra-hard abrasive particles may be diamond or cubic boron nitride, but are preferably diamond particles.

The ultra-hard abrasive particle mass will be subjected to known temperature and pressure conditions necessary to produce an abrasive compact. These conditions are typically those required to synthesize the abrasive particles themselves. Generally, the pressures used will be in the range 40 to 70 kilobars and the temperature used will be in the range 1300° C. to 1600° C.

The abrasive compact which is produced by the method of the invention will generally and preferably have a binder present. The binder will preferably be a catalyst/solvent for the ultra-hard abrasive particle used. Catalyst/solvents for diamond and cubic boron nitride are well known in the art. In the case of diamond, the binder is preferably cobalt, nickel, iron or an alloy containing one or more of these metals.

When a binder is used, particularly in the case of diamond compacts, it may be caused to infiltrate the mass of abrasive particles during compact manufacture. A shim or layer of the binder may be used for this purpose. Alternatively, and preferably, the binder is in particulate form and is mixed with the mass of abrasive particles. The binder will typically be present in an amount of 10 to 25 percent by mass in the abrasive compact produced.

The abrasive compact, particularly for diamond compacts, will generally be bonded to a cemented carbide support or substrate forming a composite abrasive compact. To produce such a composite abrasive compact, the mass of abrasive particles will be placed on a surface of a cemented carbide body before it is subjected to the elevated temperature and pressure conditions necessary for compact manufacture. The cemented carbide support or substrate may be any known in the art such as cemented tungsten carbide, cemented tantalum carbide, cemented titanium carbide, cemented molybdenum carbide or mixtures thereof. The binder metal for such carbides may be any known in the art such as nickel, cobalt, iron or an alloy containing one or more of these metals. Typically, this binder will be present in an amount of 10 to 20 percent by mass, but this may be as low as 6 percent by mass. Some of the binder metal will generally infiltrate the abrasive compact during compact formation.

The method of the invention is characterized by the abrasive particle mass which is used. The mass contains at least three types of abrasive particles differing from each other in their average particle size. The major amount of the particles will be close to the specified size although there will be a limited number of particles above and below the specified size. The peak in the distribution of the particles will have the specified size. Thus, for example, if the average particle size is 10 microns, there will be some particles which are larger and some particles which are smaller than 10 microns, but the major amount of the particles will be at approximately 10 microns in size and the peak in the distribution of the particles will be 10 microns. The use of at least three types of abrasive particles differing from each other in their average particle size has the effect of widening or broadening of the size distribution of the particles allowing for closer packing and minimizing of binder pool formation, when a binder is present. The particles are preferably all uncoated.

In the characterizing abrasive particle mass of the invention, the abrasive particles have an average particle size of less than 20 microns, and consists of at least three types of abrasive particle differing only in their average particle size. Examples of such abrasive particle masses are as follows:

| | |
|---|---|
| 10 to 20 microns - | 20 to 30 percent by mass |
| 5 to 9 microns - | 20 to 30 percent by mass |
| less than 5 microns - | 40 to 60 percent by mass |
| | and |
| 10 to 20 microns - | 20 to 30 percent by mass |
| 5 to 9 microns - | 40 to 60 percent by mass |
| less than 5 microns - | 20 to 30 percent by mass. |

The compacts of the invention are fine grained compacts since the abrasive particle mass having an average size of less than 20 microns is used. They may be used as tool inserts for turning or cutting a substrate, but have particular application in drilling applications, such as oil well drilling and other earth drilling applications.

Examples of the invention will now be described.

EXAMPLE 1

A diamond mass was placed on a surface of a cemented carbide substrate (13 percent by mass cobalt binder) in the reaction capsule of a conventional high pressure/high temperature apparatus. This reaction capsule was placed in the reaction zone of the apparatus and subjected to a temperature of 1400° C. and a pressure of 50 to 60 kilobars and these elevated temperature and pressure conditions maintained for a period of 10 minutes. Recovered from the reaction capsule was a composite diamond compact consisting of a diamond compact bonded to a cemented carbide substrate.

The diamond mass used in producing this compact consisted of 50 percent by mass of 4 micron diamond, 25 percent by mass of 8 micron diamond and 25 percent by mass of 12 micron diamond, each micron size being an average particle size.

Cobalt from the cemented carbide substrate infiltrated the diamond mass during compact formation. This cobalt was found to be uniformly and evenly distributed through the compact with no visible cobalt pool formation being observed. The cobalt content of the compact was about 15 percent by mass. The compact was a fine grained compact because particles having an average particle size of less than 20 microns were used in the starting diamond mass.

EXAMPLE 2

A diamond mass was mixed with powdered cobalt and placed on a surface of a cemented carbide substrate. The diamond mass constituted 80 percent by mass of the mixture and the cobalt the balance. The unbonded assembly was placed in a reaction capsule in a conventional high pressure/high temperature apparatus. This reaction capsule was placed in the reaction zone of the apparatus and subjected to a temperature of 1400° C. and a pressure of 50 to 60 kilobars. These elevated temperature and pressure conditions were maintained for a period of 10 minutes. Recovered from the reaction capsule was a composite diamond compact consisting of a diamond compact bonded to a cemented carbide substrate.

The diamond mass used consisted of five types of diamond, each differing in average particle size:

| Average Particle Size Microns | Percent by Mass |
|---|---|
| 19 | 27.8 |
| 9 | 44.4 |
| 5 | 6.7 |
| 4 | 16.7 |
| 2 | 4.4 |

As with the compact of Example 1, cobalt was found to be uniformly distributed through the compact with no cobalt pool formation being observed. The cobalt content was about 15 percent by mass.

The strength and wear characteristics of a diamond compact thus produced was compared with two similar diamond compacts made according to the prior art. These prior art diamond compacts were made under the same temperature and pressure conditions used to make the diamond compact of this Example. The same cemented carbide substrate composition was also used. The diamond mass was a conventional diamond mass consisting of particles having average particle size of 25 microns. In the case of the one compact, designated A, the cobalt was infiltrated into the diamond mass from a cobalt shim placed between the diamond particles and the cemented carbide substrate. In the case of the other compact, designated B, cobalt powder was mixed with the diamond particles.

Turning tests were carried out using the three compacts. The compacts were mounted on the end of a standard turning tool such that an edge of the compact was presented to the workpiece. The workpiece was then rotated and the cutting edge of the compact brought in contact with the turning workpiece to effect cutting or turning. The infeed in each case was 0.4 mm, the depth of cut was 0.5 mm and the workpiece was Paarl granite. Wet turning conditions were used.

In one test, the push-off force was measured using a force transducer. As a wear flat on the cutting edge of a compact grows, there is more friction and a greater force is needed to keep the tool in contact with the workpiece. Thus, the higher the push-off force, the greater the wear flat, and the poorer the cutting edge. Average push-off forces in newtons for the three compacts were established at rotational workpiece speeds of 50, 60, 70, 80 and 90 meters per minute. The results obtained are set out graphically in FIG. 1. In this figure, A and B designate the prior art compacts and invention designates the compact of this example. It will be noted from FIG. 1 that for all speeds, save for 50 meters per minute, the compact of the invention showed a lower average push-off force and hence better abrasive strength and properties than the two prior art compacts. At the higher speeds, the cutting edge of the compact of the invention has a longer effective working life than the prior art compacts.

Figure 2:
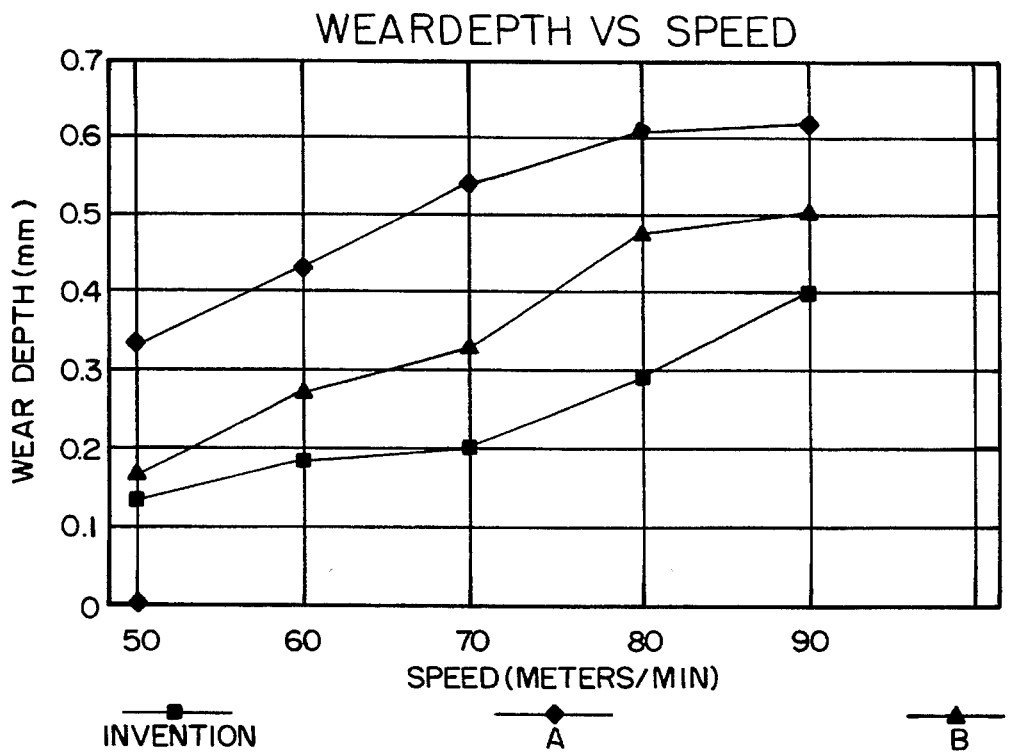

In a similar test, the wear depth against speed of the three compacts was determined using the same range of speeds. The results are set out graphically in FIG. 2 which shows that the compact of the invention had the lowest wear depth at each of the speeds demonstrating that it has better wear characteristics than either of the two prior art compacts.

We claim:

1. A method of making an abrasive compact which includes the step of subjecting a mass of ultra-hard abrasive particles to conditions of elevated temperature and pressure suitable for producing an abrasive compact, wherein the mass of ultra-hard abrasive particles has an average particle size of less than 20 microns and consists of particles having at least a tri-modal particle size distribution.

2. A method according to claim 1 wherein the mass of ultra-hard abrasive particles has an average particle size of less than 15.

3. A method according to claim 1 wherein the mass of ultra-hard abrasive particles has the following distribution.

| Average Particle Size (Microns) | % by Mass |
| --- | --- |
| 10–20 | 20–30 |
| 5–9 | 20–30 |
| Less than 5 | 40–60. |

4. A method according to claim 1 wherein the mass of ultra-hard abrasive particles has the following distribution:

| Average Particle Size (Microns) | % by Mass |
| --- | --- |
| 10–20 | 20–30 |
| 5–9 | 40–60 |
| Less than 5 | 20–30. |

5. A method of claim 1 wherein the ultra-hard abrasive particles are selected from diamond and cubic boron nitride particles.

6. A method according to claim 1 wherein a binder is caused to infiltrate the mass of ultra-hard abrasive particles when the mass is subjected to the elevated temperature and pressure conditions.

7. A method according to claim 1 wherein binder is mixed with the mass of ultra-hard abrasive particles.

8. A method according to claim 6 wherein the binder is a solvent/catalyst for the ultra-hard abrasive particle.

9. A method according to claim 8 wherein the ultra-hard abrasive particle is diamond and the binder is selected from cobalt, nickel, iron and alloys containing one or more of these metals.

10. A method according to claim 1 wherein the mass of ultra-hard abrasive particles is placed on a surface of a cemented carbide body before it is subjected to the elevated temperature and pressure conditions.

11. A method according to claim 1 wherein the elevated temperature and pressure conditions are a pressure in the range 40 to 70 kilobars and a temperature in the range 1300° to 1600° C.

12. A method according to claim 1 wherein the ultra-hard abrasive particles are uncoated.

* * * * *